(12) United States Patent
Kubo (10) Patent No.: US 12,552,333 B2
(45) Date of Patent: Feb. 17, 2026

(54) INFORMATION PROCESSING DEVICE

(71) Applicant: TOYOTA JIDOSHA KABUSHIKI KAISHA, Toyota (JP)

(72) Inventor: Chikage Kubo, Cyofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/501,549

(22) Filed: Nov. 3, 2023

(65) Prior Publication Data
US 2024/0239278 A1 Jul. 18, 2024

(30) Foreign Application Priority Data
Jan. 13, 2023 (JP) ................................. 2023-003989

(51) Int. Cl.
| | | |
|---|---|---|
| *G06F 3/048* | (2013.01) |
| *B60R 16/023* | (2006.01) |
| *G06F 3/0484* | (2022.01) |
| *G07C 5/02* | (2006.01) |

(52) U.S. Cl.
CPC ........ *B60R 16/0231* (2013.01); *G06F 3/0484* (2013.01); *G07C 5/02* (2013.01)

(58) Field of Classification Search
CPC ...... B60R 16/0231; G06F 3/0484; G07C 5/02
See application file for complete search history.

(56) References Cited

U.S. PATENT DOCUMENTS

| | | | | |
|---|---|---|---|---|
| 6,667,726 | B1 * | 12/2003 | Damiani ................ | B60K 35/28 701/1 |
| 7,269,726 | B1 * | 9/2007 | Corella .................... | H04L 9/006 726/18 |
| 7,734,392 | B2 * | 6/2010 | Schofield .................. | B60R 1/12 340/438 |
| 8,700,318 | B2 * | 4/2014 | Tan ........................ | G01C 21/36 701/400 |
| 2002/0085043 | A1 * | 7/2002 | Ribak .................... | B60K 35/29 715/810 |
| 2005/0116879 | A1 * | 6/2005 | Arai ........................ | B60K 35/22 340/425.5 |
| 2007/0126698 | A1 * | 6/2007 | Iwamoto ............... | G06F 3/0482 345/156 |
| 2009/0160732 | A1 * | 6/2009 | Kimura .................. | G06F 3/0416 340/425.5 |
| 2009/0195712 | A1 * | 8/2009 | Strohmaier ....... | H04N 21/41422 345/173 |
| 2009/0240397 | A1 * | 9/2009 | Schofield ................ | B60R 1/12 701/36 |
| 2011/0165551 | A1 * | 7/2011 | Yamazaki .............. | G01C 21/36 434/365 |

(Continued)

FOREIGN PATENT DOCUMENTS

| | | |
|---|---|---|
| JP | 2008-001247 A | 1/2008 |
| JP | 2021-091394 A | 6/2021 |

(Continued)

*Primary Examiner* — Linh K Pham
(74) *Attorney, Agent, or Firm* — SoraIP, Inc.

(57) ABSTRACT

A control unit of the information processing device outputs an electronic manual regarding a first function executed by the first device. At this time, the control unit of the information processing device outputs the electronic manual and the first interface for causing the first device to execute the first function.

9 Claims, 5 Drawing Sheets

(56) References Cited

U.S. PATENT DOCUMENTS

| | | | |
|---|---|---|---|
| 2014/0259030 A1* | 9/2014 | Mizuguchi | G06F 9/451 |
| | | | 719/328 |
| 2017/0061708 A1* | 3/2017 | Sol | G06F 8/65 |
| 2017/0180381 A1* | 6/2017 | Gerlach | H04L 67/34 |
| 2019/0041652 A1* | 2/2019 | Murayama | B60K 35/53 |
| 2020/0066070 A1* | 2/2020 | Wells | G07C 5/0833 |
| 2020/0177398 A1* | 6/2020 | Takemori | H04L 63/0823 |
| 2020/0257413 A1* | 8/2020 | Jung | B60K 35/10 |
| 2020/0285331 A1* | 9/2020 | Lindahl | B60R 1/24 |
| 2021/0334227 A1* | 10/2021 | Helm | G06F 13/22 |
| 2022/0256325 A1 | 8/2022 | Hasegawa | |
| 2022/0289228 A1* | 9/2022 | Yamamoto | B60K 35/80 |
| 2023/0209292 A1* | 6/2023 | Kajimoto | H04S 7/302 |
| | | | 381/86 |
| 2024/0028692 A1* | 1/2024 | Liao | G06F 21/629 |
| 2024/0262340 A1* | 8/2024 | Numajiri | A47C 7/72 |

FOREIGN PATENT DOCUMENTS

| | | |
|---|---|---|
| JP | 2022-122717 A | 8/2022 |
| WO | 2010/047035 A1 | 3/2012 |

\* cited by examiner

ABOUT THE FIRST FUNCTION BY
THE FIRST DEVICE

EXPLANATION
* * * * * * * * * * * *
* * * * * * * * * * * *
* * * * * * * * * * * *

FIRST FUNCTION
EXECUTION BUTTON

SECOND FUNCTION
EXECUTION BUTTON

FIG. 4

| EQUIPMENT INFORMATION | | | | | | | |
|---|---|---|---|---|---|---|---|
| DEVICE ID | FUNCTION ID | MANUAL | FIRST CONDITION | ASSOCIATED DEVICE ID | ASSOCIATED FUNCTION ID | SECOND CONDITION |
| *** | *** | *** | *** | *** | *** | *** |
| | ... | ... | ... | ... | ... | ... |
| | *** | *** | *** | *** | *** | *** |
| ... | ... | ... | ... | ... | ... | ... |

INFORMATION PROCESSING DEVICE

CROSS-REFERENCE TO RELATED APPLICATION

This application claims priority to Japanese Patent Application No. 2023-003989 filed on Jan. 13, 2023, incorporated herein by reference in its entirety.

BACKGROUND

1. Technical Field

The present disclosure relates to an information processing device.

2. Description of Related Art

Japanese Unexamined Patent Application Publication No. 2022-122717 (JP 2022-122717 A) discloses an information processing device associated with a predetermined vehicle. A control unit of the information processing device disclosed in JP 2022-122717 A receives an emergency message that indicates occurrence of a predetermined event. The control unit of the information processing device presents an electronic manual corresponding to the predetermined vehicle to a user when the emergency message is received.

SUMMARY

An object of the present disclosure is to improve convenience when a user executes a predetermined function.

An information processing device according to the present disclosure includes a control unit configured to: output an electronic manual relating to a first function executed by a first device; and output a first interface for causing the first device to execute the first function together with the electronic manual.

The present disclosure makes it possible to improve convenience when a user executes a predetermined function.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

It is assumed that a user browses an electronic manual for a first function executed by a first device, which is output by an information processing device. At this time, if the user wants the first device to execute the first function, the user must perform the operation described in the electronic manual on the first device. Then, the user has to refer to both the electronic manual and the first device, which may be annoying. Therefore, the information processing device according to the present disclosure solves such problems.

An information processing device according to the present disclosure is a device that outputs an electronic manual to a user. A control unit of an information processing device according to the present disclosure outputs an electronic manual regarding a first function executed by a first device. Also, the control unit of the information processing device outputs the electronic manual and the first interface for causing the first device to execute the first function. Here, the interface is a graphical user interface.

This allows the first device to directly execute the first function while browsing the electronic manual without performing an operation according to the procedure for causing the first device to execute the first function. As a result, it is possible to improve convenience when the user executes the first function.

Hereinafter, embodiments of the present disclosure will be described below with reference to the drawings. Unless otherwise specified, dimensions, materials, shapes, relative arrangements, and the like of components described in the present embodiments are not intended to limit the technical scope of the present disclosure to those alone.

Embodiment

Figure 1:
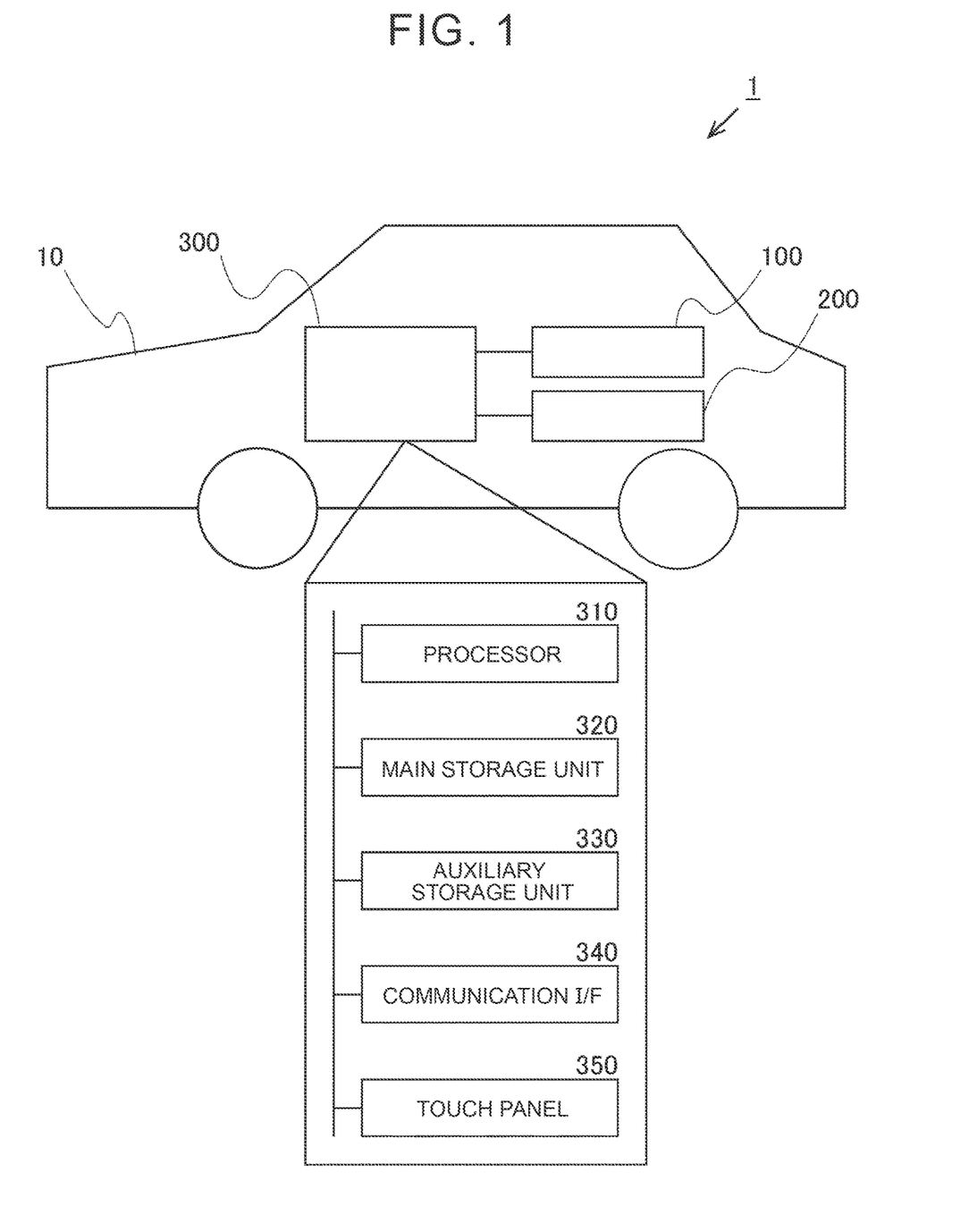
FIG. 1 is a diagram showing a schematic configuration of a manual display system.

A manual display system 1 according to the present disclosure will be described based on FIG. 1. FIG. 1 is a diagram showing a schematic configuration of a manual display system 1. Manual display system 1 includes vehicle 10, first device 100, second device 200, and manual terminal 300. In manual display system 1, vehicle 10, first device 100, second device 200, and manual terminal 300 are interconnected by an in-vehicle network.

Vehicle

A vehicle 10 is a vehicle in which various in-vehicle devices are mounted. The vehicle 10 is equipped with a plurality of in-vehicle devices such as a car navigation system, an electronic control unit, a sensor for sensing conditions inside the vehicle, and a display.

First Device

The first device 100 is an in-vehicle device mounted on the vehicle 10. In this embodiment, the first device 100 is a display provided inside the vehicle 10. The first device 100 has a function of displaying television broadcasts to passengers sitting in the rear seats of the vehicle 10 (hereinafter sometimes referred to as "first function"). At this time, the first device 100 is provided at a position where the television broadcast cannot be seen from the driver's seat of the vehicle 10.

Second Device

The second device 200 is an in-vehicle device mounted on the vehicle 10. In this embodiment, the second device 200 is a display provided inside the vehicle 10. The second device 200 has a function of displaying television broadcasts to passengers sitting in the driver's seat of the vehicle 10 (hereinafter sometimes referred to as "second function").

Manual Terminal

Manual terminal 300 is an in-vehicle device mounted in vehicle 10. The manual terminal 300 has a function of outputting electronic manuals for various in-vehicle devices installed in the vehicle 10 to the user. The manual terminal 300 has a touch panel. As a result, the manual terminal 300 can accept input of various information by the user and output (display) the electronic manual.

Here, it is assumed that the user intends to view the electronic manual for the first function executed by the first device 100, which is output by the manual terminal 300. At this time, when the user wants to cause the first device 100 to execute the first function, the user performs an operation according to the procedure for causing the first device 100 to execute the first function while viewing the electronic manual.

In addition, manual terminal 300 may also serve as an operation interface for causing first device 100 to execute the first function. Furthermore, while the manual terminal 300 is displaying the electronic manual, there are cases where it does not accept operations other than those related to the electronic manual. Then, the user interrupts the display of the electronic manual, and then performs an operation on the manual terminal 300 to cause the first device 100 to execute the first function. At this time, if the user forgets the procedure for executing the first function, the manual terminal 300 is caused to output the electronic manual again, and the electronic manual must be viewed for the procedure for causing the first device 100 to execute the first function. In this way, when the user tries to cause the first device 100 to execute the first function, the user may feel annoyed.

Figure 2:
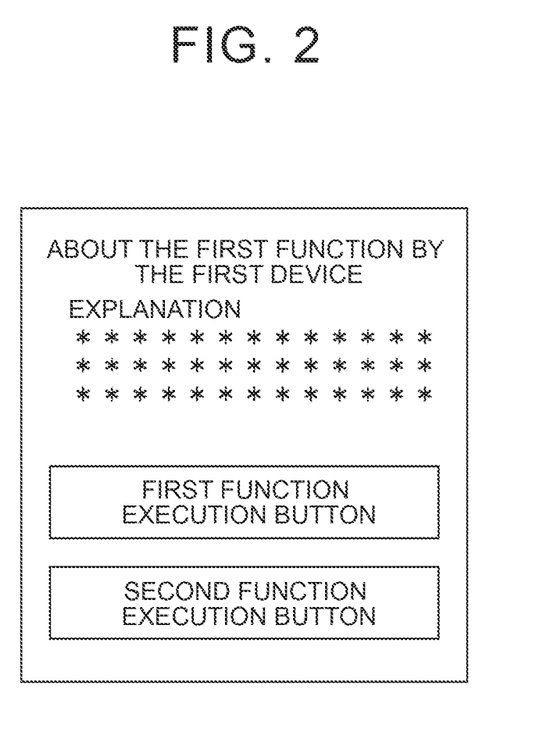
FIG. 2 is an example of a specific manual output by a manual terminal.

Therefore, when the manual terminal 300 outputs the electronic manual for the first function executed by the first device 100 (hereinafter sometimes referred to as the "specific manual"), the manual terminal 300 outputs the specific manual and an interface (hereinafter sometimes referred to as the "first interface") for causing the first device 100 to execute the first function. FIG. 2 is an example of a specific manual output by the manual terminal 300. As shown in FIG. 2, the specific manual includes an explanation column for the first function. The user can understand the first function executed by the first device 100 by viewing the explanation column output in the specific manual. Also, as shown in FIG. 2, a "first function execution button" is output together with a specific manual as the first interface. The user can cause the first device 100 to execute the first function by touching the first function execution button on the screen with the finger.

In this embodiment, the manual terminal 300 identifies the second function by the second device 200 as a function related to the first function by the first device 100. That is, manual terminal 300 identifies the function of displaying television broadcasts to the driver by second device 200 as a function related to the function of displaying television broadcasts to passengers in the rear seats by first device 100. Then, manual terminal 300 outputs an interface (hereinafter sometimes referred to as "second interface") for causing second device 200 to execute the second function together with the specific manual. As shown in FIG. 2, a "second function execution button" is output together with a specific manual as the second interface. The user can cause the second device 200 to execute the second function by touching the second function execution button with the finger.

In this embodiment, whether to output the first interface or the second interface is determined according to the running condition of the vehicle 10. The details of how the manual terminal 300 outputs the specific manual will be described later.

Manual terminal 300 includes a computer having processor 310, main memory 320, auxiliary memory 330, communication interface (communication I/F) 340, and touch panel 350. Processor 310 is, for example, a Central Processing Unit (CPU) or a Digital Signal Processor (DSP). The main storage unit 320 is, for example, Random Access Memory (RAM). The auxiliary storage unit 330 is, for example, Read Only Memory (ROM). Also, the auxiliary storage unit 330 is, for example, a hard disk drive (HDD), or a disc recording medium such as a CD-ROM, a DVD disc, or a Blu-ray disc. Also, the auxiliary storage unit 330 may be a portable storage medium (removable medium). Examples of the removable medium include a USB memory or an SD card. The communication I/F 340 is, for example, a Local Area Network (LAN) interface board or a wireless communication circuit for wireless communication. Touch panel 350 is a touch panel display.

In the manual terminal 300, the auxiliary storage unit 330 stores an operating system (OS), various programs, various information tables, and the like. In manual terminal 300, processor 310 loads a program stored in auxiliary storage unit 330 into main storage unit 320 and executes it, thereby realizing various functions as described later. However, some or all of the functions of manual terminal 300 may be realized by hardware circuits such as ASIC or FPGA. Note that the manual terminal 300 does not necessarily have to be realized by a single physical configuration, and may be configured by a plurality of computers that cooperate with each other. Further, the vehicle 10, the first device 100, and the second device 200, like the manual terminal 300, each include a computer.

Functional Configuration

Figure 3:
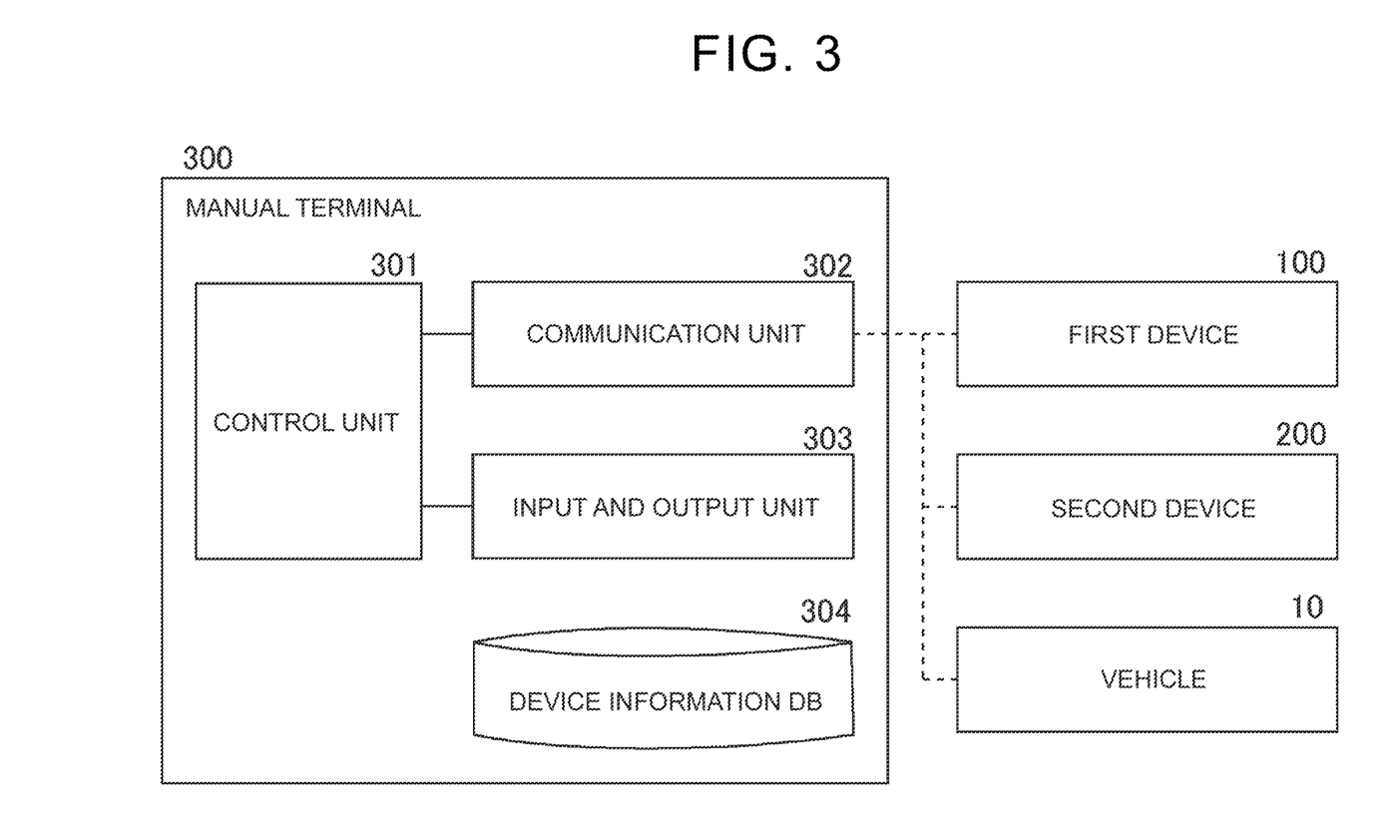
FIG. 3 is a block diagram schematically showing an example of the functional configuration of a manual terminal that constitutes the manual display system.

Next, the functional configuration of the manual terminal 300 that constitutes the manual display system 1 will be described with reference to FIG. 3. FIG. 3 is a block diagram schematically showing an example of the functional configuration of the manual terminal 300 that constitutes the manual display system 1.

The manual terminal 300 includes a control unit 301, a communication unit 302, an input/output unit 303, and a device information database 304 (device information DB 304). The control unit 301 has a function of performing arithmetic processing for controlling the manual terminal 300. Control unit 301 can be realized by processor 310 in manual terminal 300. The communication unit 302 has a function of connecting the manual terminal 300 to the in-vehicle network. Communication unit 302 can be realized by communication I/F 340 in manual terminal 300.

The input/output unit 303 has a function for the user to input various information to the manual terminal 300. The input/output unit 303 also has a function of displaying various information to the user. Input/output unit 303 can be realized by touch panel 350 in manual terminal 300.

The input/output unit 303 acquires information about an electronic manual that the user desires to output (hereinafter sometimes referred to as "input information") through input by the user. The input information includes information for specifying the in-vehicle device for which the user wishes to output the electronic manual and its function. Here, the user may acquire the input information by, for example, receiving an operation of designating the in-vehicle device for which the user wishes to output the electronic manual and its function on the screen displayed on the input/output unit 303. Further, if the input/output unit 303 has a microphone, the input information may be acquired by acquiring the user's speech for displaying the electronic manual desired by the user.

The device information DB 304 has a function of holding device information. The device information is information about the correspondence between the in-vehicle device installed in the vehicle 10, the function executable by the in-vehicle device, and the information for the input/output unit 303 to output a manual for the function (hereinafter sometimes referred to as "manual information"). In addition, the device information includes information on conditions under which the in-vehicle device mounted in the vehicle 10 can execute the function. Further, the device information is information about association between an in-vehicle device (related device) capable of executing a function related to the function executed by the in-vehicle device mounted in the vehicle 10 and a function (related function) related to the function executed by the in-vehicle device. The device information also includes information about the conditions under which the associated device can perform the associated function. Device information DB 304 can be realized by auxiliary storage unit 330 in manual terminal 300.

Figure 4:
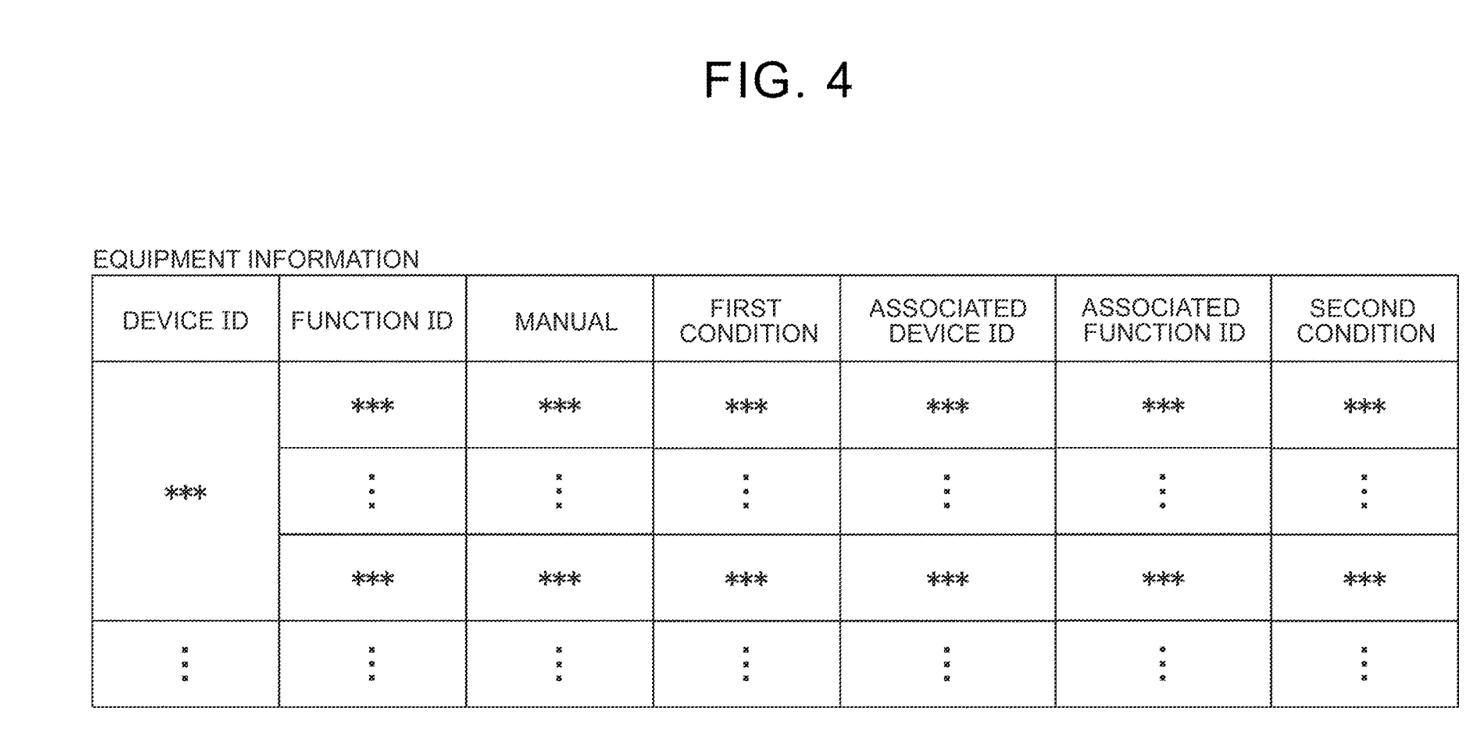
FIG. 4 is a diagram showing an example of a table configuration of device information.

FIG. 4 is a diagram showing an example of a table configuration of device information. The device information has a device ID field, a function ID field, a manual field, a first condition field, a related device ID field, a related function ID field, and a second condition field. The device ID field stores an identifier (device ID) for specifying an in-vehicle device mounted on the vehicle 10. The function ID field stores an identifier (function ID) for specifying a function that can be executed by the in-vehicle device corresponding to the device ID.

The manual field stores manual information about the function corresponding to the function ID by the in-vehicle device corresponding to the device ID. When outputting the electronic manual for the function corresponding to the function ID of the in-vehicle device corresponding to the device ID, the control unit 301 outputs the electronic manual based on the manual information stored in the manual field.

The first condition field stores information about conditions under which the in-vehicle device corresponding to the device ID is inappropriate to execute the function corresponding to the function ID. In the present embodiment, the first condition field stores information about the driving conditions of the vehicle 10 that make it inappropriate for the in-vehicle device corresponding to the device ID to execute the function corresponding to the function ID. Here, if the function corresponding to the function ID can be executed regardless of the running condition of the vehicle 10, a null value may be stored in the first condition field.

The related device ID field stores an identifier (related device ID) for specifying an in-vehicle device capable of executing the function corresponding to the function ID executed by the in-vehicle device related to the in-vehicle device corresponding to the device ID. The same identifier is stored as the device ID and the related device ID when the in-vehicle device is the same. The related function ID field stores an identifier (related function ID) for identifying the function executed by the related device ID. Here, the identifier of the same in-vehicle device may be stored in the device ID field and the related device ID field. That is, the same in-vehicle device (in-vehicle device corresponding to the device ID) may be stored as a related device of the in-vehicle device corresponding to the device ID.

The second condition field stores information about the conditions under which the in-vehicle device corresponding to the related device ID is inappropriate to execute the function corresponding to the related function ID. In the present embodiment, the second condition field stores information about the driving conditions of the vehicle 10 in which the in-vehicle device corresponding to the related device ID is inappropriate to execute the function corresponding to the related function ID. Here, if the function corresponding to the related function ID can be executed regardless of the driving condition of the vehicle 10, a null value may be stored in the second condition field.

Based on the input information, the control unit 301 identifies the in-vehicle device for which the user wishes to output the electronic manual and its function. Then, based on the device information held in the device information DB 304, the control unit 301 identifies the device ID and the function ID corresponding to the in-vehicle device to which the user wishes to output the electronic manual and the function thereof, which are included in the input information. Further, control unit 301 acquires manual information and first conditions corresponding to the specified device ID and function ID based on the device information. Also, based on the device information, the control unit 301 acquires the related device ID, the related function ID, and the second condition corresponding to the specified device ID and function ID. As a result, based on the device information, the control unit 301 can grasp the manual information and the first condition regarding the in-vehicle device for which the user desires to output an electronic manual and its functions. In addition, the control unit 301 can grasp the related device, the related function, and the second condition corresponding to the in-vehicle device and its function for which the user wishes to output the electronic manual.

In the present embodiment, the control unit 301 acquires the running status of the vehicle 10 from the vehicle 10 via the communication unit 302. Specifically, the control unit 301 acquires the driving conditions of the vehicle 10 from an electronic control unit provided in the vehicle 10, a sensor that senses conditions inside the vehicle, or the like. Then, the control unit 301 determines whether or not the running condition of the vehicle 10 satisfies the first condition. Further, the control unit 301 determines whether or not the running condition of the vehicle 10 satisfies the second condition. Then, control unit 301 determines whether to output an interface for executing a function together with the electronic manual, based on whether the running condition of vehicle 10 satisfies the first condition and the second condition.

Here, it is assumed that the user wishes to output an electronic manual for the first function of the first device 100. In this case, while the vehicle 10 is running, even if a passenger sitting in the rear seat views the television broadcast displayed by the first device 100, the running of the vehicle 10 is not affected.

However, when the vehicle 10 is running with the fuel or battery remaining at a predetermined level or less, the first device 100 may further consume the fuel or battery by executing the first function. Therefore, when the vehicle 10 is running with the remaining amount of fuel or drive battery below a predetermined level, the execution of the first function by the first device 100 is inappropriate. Further, when no passenger is seated in the rear seat of the vehicle 10, the television broadcast displayed on the first device 100 is not viewed even if the first device 100 executes the first function. Therefore, when no passenger is seated in the rear seat of the vehicle 10, execution of the first function by the first device 100 is inappropriate. Therefore, in the device information held in the device information DB 304, the first condition field for execution of the first function by the first device 100 stores information indicating that the fuel or drive battery of the vehicle 10 is in a state of being below a predetermined remaining amount. Information indicating that no passenger is seated in the rear seat of the vehicle 10 is stored in the first condition field for execution of the first function by the first device 100. In other words, the first condition is set so that the first function by the first device 100 cannot be executed when the fuel or driving battery of the vehicle 10 is below a predetermined remaining amount, or when the passenger is not seated in the rear seat of the vehicle 10.

On the other hand, assume that the second device 200 performs the second function. In this case, if a passenger seated in the driver's seat of the vehicle 10 views the television broadcast displayed by the second device 200 while the vehicle 10 is not stopped, the vehicle 10 may run dangerously. Also, similar to the first function performed by the first device 100, the second function performed by the second device 200 is inappropriate when the amount of fuel or drive battery in the vehicle 10 is below a predetermined level. Therefore, information indicating that the vehicle 10 is not stopped is stored in the second condition field for execution of the second function by the second device 200 in the device information held in the device information DB 304. The second condition field for execution of the second function by the second device 200 stores information indicating that the remaining amount of fuel or drive battery of the vehicle 10 is below a predetermined level. In other words, when the vehicle 10 is not stopped, or when the amount of fuel or drive battery in the vehicle 10 is below a predetermined remaining amount, the second function by the second device 200 cannot be executed.

Therefore, when the user desires to output a specific manual, the control unit 301 acquires from the vehicle 10 information as to whether the vehicle 10 is stopped, information for specifying the running mode of the vehicle 10, and information as to whether or not a passenger is seated in the rear seat of the vehicle 10. Here, the information as to whether the vehicle 10 is stopped and the information for specifying the traveling mode of the vehicle 10 are obtained from an electronic control unit that controls traveling of the vehicle 10, for example. Further, the information as to whether or not a passenger is on the rear seat of the vehicle 10 is acquired from, for example, a sensor that detects the seating of the passenger provided in the rear seat. A sensor that detects the seating of a passenger provided in the rear seat is, for example, a weight sensor provided in the rear seat. At this time, the weight sensor detects whether the passenger is seated in the rear seat by detecting the weight of the passenger on the rear seat.

In this way, the control unit 301 determines whether to output the first interface together with the specific manual, based on whether or not the running condition of the vehicle 10 satisfies the first condition for the first function of the first device 100. Further, control unit 301 determines whether to output the second interface together with the specific manual, based on whether or not the running condition of vehicle 10 satisfies the second condition for the second function of second device 200. In this way, the control unit 301 determines whether or not the first device 100 can be caused to execute the first function and whether or not the second device 200 can be caused to execute the second function, based on the running condition of the vehicle 10. Based on the determination result, the control unit 301 determines whether to output both or one of the first interface and the second interface together with the specific manual, or not to output both. Then, based on the determination result, control unit 301 transmits to input/output section 303 specific information for causing input/output section 303 to output a specific manual. As a result, the input/output unit 303 can output the specific manual based on the specific information to the user.

Flowchart

Figure 5:
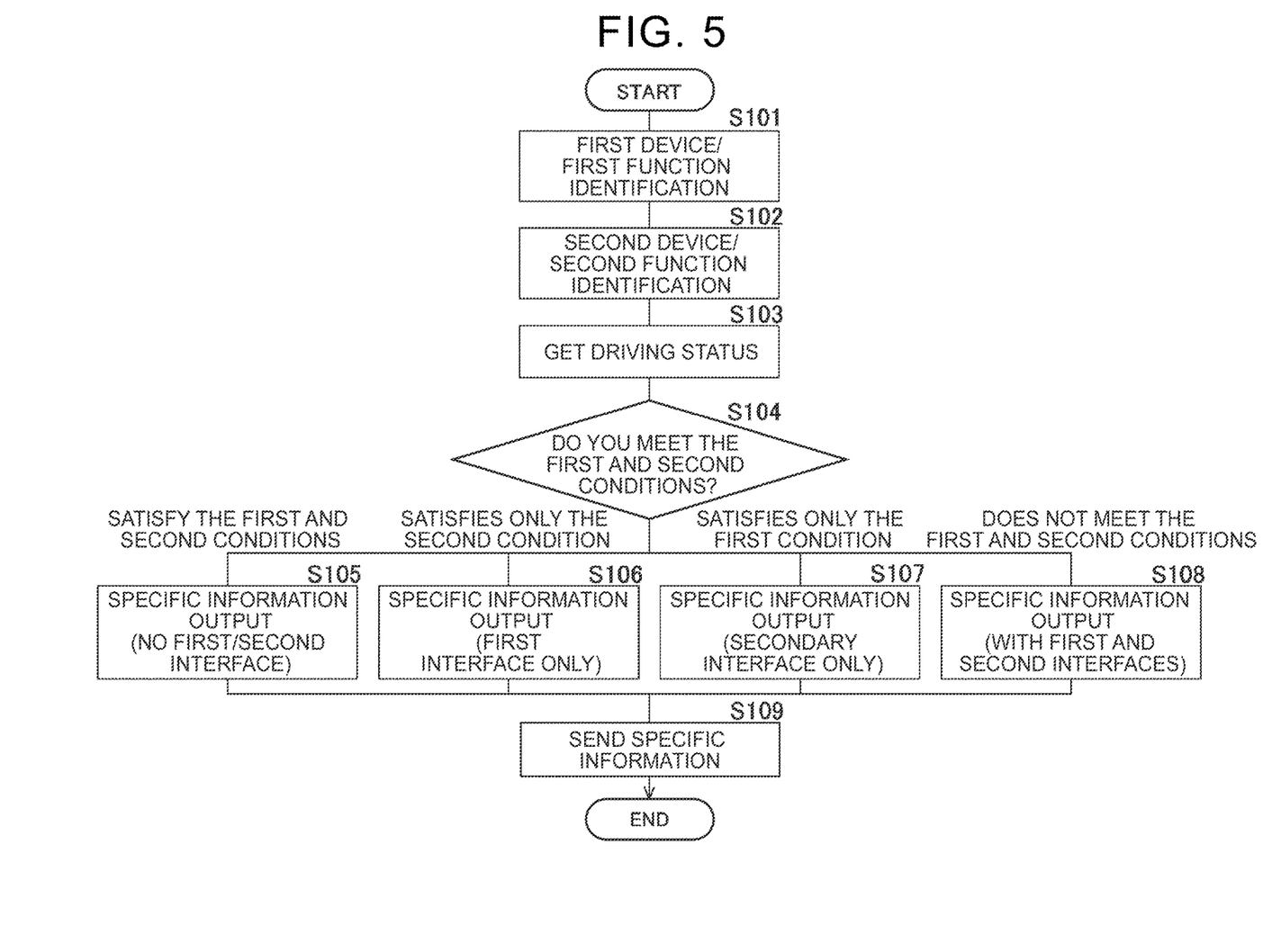
FIG. 5 is a flowchart of processing executed by the control unit of the manual terminal.

Next, processing executed by the control unit 301 of the manual terminal 300 in the manual display system 1 will be described with reference to FIG. 5. FIG. 5 is a flowchart of processing executed by the control unit 301. This process is for causing the input/output unit 303 to output a specific manual. The processing shown in FIG. 5 is started when the control unit 301 acquires input information from the input/output unit 303. Note that FIG. 5 illustrates processing when the input information is information indicating that the first device 100 desires to output an electronic manual for the first function.

In the process shown in FIG. 5, first, in S101, the first device 100 and the first function are specified based on the input information. Next, in S102, based on the device information held in the device information DB 304, the second device 200 and the second function are specified as related devices and related functions corresponding to the first device 100 and the first function. Next, in S103, the running condition of the vehicle 10 is acquired from the electronic control unit in the vehicle 10 and the sensor that senses whether or not a passenger is seated in the rear seat of the vehicle 10. Next, in S104, it is determined whether or not the running condition of the vehicle 10 satisfies the first condition and the second condition.

When it is determined in S104 that the running condition of the vehicle 10 satisfies the first condition and the second condition, specific information is output in S105. Specifically, this determination is made when the amount of fuel or drive battery in the vehicle 10 is below a predetermined level. Here, the specific information output in S105 is specific information for the input/output unit 303 to output a specific manual that does not include the first interface and the second interface. Next, in S109, the output specific information is transmitted to the input/output unit 303, and the processing shown in FIG. 5 is terminated. This allows the input/output unit 303 to output a specific manual that does not include the first interface and the second interface.

Further, when it is determined in S104 that the running condition of the vehicle 10 satisfies only the second condition, the specific information is output in S106. Specifically, the determination is made when the following conditions are satisfied: that the fuel or drive battery of the vehicle 10 is not below a predetermined remaining amount, that the vehicle 10 is not stopped, and that a passenger is seated in the rear seat of the vehicle 10. Here, the specific information output in S106 is specific information for the input/output unit 303 to output only the first interface together with the specific manual. Next, in S109, the output specific information is transmitted to the input/output unit 303, and the processing shown in FIG. 5 is terminated. This allows the input/output unit 303 to output a specific manual including only the first interface.

Further, when it is determined in S104 that the running condition of the vehicle 10 satisfies only the first condition, the specific information is output in S107. Specifically, the determination is made when the following conditions are satisfied: that the fuel or driving battery of the vehicle 10 is not in a state of a predetermined residual amount or less, that the vehicle 10 is stopped, and that no passenger is seated in the rear seat of the vehicle 10. Here, the specific information output in S107 is specific information for the input/output unit 303 to output only the second interface together with the specific manual. Next, in S109, the output specific information is transmitted to the input/output unit 303, and the processing shown in FIG. 5 is terminated. This allows the input/output unit 303 to output a specific manual including only the second interface.

Further, when it is determined in S104 that the running condition of the vehicle 10 satisfies only the first condition, the specific information is output in S108. Specifically, the determination is made when the following conditions are satisfied: that the fuel or drive battery of the vehicle 10 is not in a state of a predetermined residual amount or less, that the vehicle 10 is stopped, and that a passenger is seated in the rear seat of the vehicle 10. Here, the specific information output in S108 is specific information for outputting the first interface and the second interface together with the specific manual. Next, in S109, the output specific information is transmitted to the input/output unit 303, and the processing shown in FIG. 5 is terminated. This allows the input/output unit 303 to output the specific manual including the first interface and the second interface.

As described above, the manual display system 1 according to the present embodiment enables the first device 100 to directly execute the first function while browsing the specific manual without performing an operation according to the procedure for causing the first device 100 to execute the first function. Also, the second device 200 can directly execute the second function while browsing the specific manual without performing an operation according to the procedure for executing the second function by the second device 200 related to the first function by the first device 100. Further, it is determined whether to output each of the first interface and the second interface together with the specific manual, based on the running condition of the vehicle 10. This makes it possible to suppress the output of the first interface and/or the second interface when the first function and/or the second function are inappropriate, depending on the driving conditions of the vehicle 10. As a result, it is possible to improve convenience when the user executes a predetermined function.

First Modification

In the present embodiment, the first condition regarding the running condition of the vehicle is whether the fuel or driving battery of the vehicle 10 is at or below a predetermined remaining amount, and whether or not a passenger is seated in the rear seat of the vehicle 10. Further, the second condition regarding the running condition of the vehicle is whether the fuel or driving battery of the vehicle 10 is at or below a predetermined remaining amount, and whether the vehicle 10 is stopped.

However, the first condition and the second condition regarding the driving situation of the vehicle do not necessarily have to be these conditions. Here, it is assumed that the driving mode of the vehicle 10 is set to the autonomous driving mode. In this case, when the vehicle 10 is traveling on a general road, it is assumed that the risk of using the autonomous driving mode is higher than when the vehicle 10 is traveling on a highway. Therefore, if the first function of the first device 100 is to set the driving mode of the vehicle 10 to the autonomous driving mode, the first condition may be, for example, that the vehicle 10 is driving on a general road. Further, when the second function of the second device 200 is a function of changing the traveling mode of the vehicle 10 to the autonomous driving mode, the second condition may be that the vehicle 10 is traveling on a general road. Manual terminal 300 acquires position information of vehicle 10 from a car navigation system or the like in vehicle 10, and determines whether vehicle 10 is traveling on a general road based on the position information.

Second Modification

In this embodiment, the manual terminal 300 determines whether to output each of the first interface and the second interface together with the specific manual, based on the driving conditions of the vehicle 10. However, manual terminal 300 may determine whether to output each of the first interface and the second interface together with the specific manual based on factors other than the driving conditions of vehicle 10. Here, there are cases where the in-vehicle device mounted in each vehicle is different. For example, in the vehicle 10, either the first device 100 or the second device 200 may not be installed. Also, the manual terminal 300 may not hold different manual information depending on the in-vehicle device installed in each vehicle. In other words, manual terminal 300 may be able to output an electronic manual for first device 100 or second device 200 even when first device 100 or second device 200 is not mounted on vehicle 10.

In this case, manual terminal 300 determines not to output the first interface together with the specific manual when first device 100 is not installed in vehicle 10. Further, manual terminal 300 determines not to output the second interface together with the specific manual when second device 200 is not installed in vehicle 10.

Further, even if the vehicle 10 is equipped with the first device 100 and the second device 200, there are cases where the first device 100 cannot execute the first function and cases where the second device 200 cannot execute the second function. If the first device 100 is a device that cannot perform the first function, the manual terminal 300 determines not to output the first interface together with the specific manual. Also, if the second device 200 is a device that cannot execute the second function, the manual terminal 300 determines not to output the second interface together with the specific manual.

Third Modification

In this embodiment, the first device 100 and the second device 200 were displays. However, the first device 100 and the second device 200 do not necessarily have to be displays. As long as the second device 200 is an in-vehicle device in which the second function by the second device 200 is related to the first function by the first device 100, the first device 100 and the second device 200 may be arbitrary in-vehicle devices.

Fourth Modification

In this embodiment, the first device 100, the second device 200 and the manual terminal 300 are in-vehicle devices mounted in the vehicle 10. However, first device 100, second device 200, and manual terminal 300 do not necessarily have to be in-vehicle devices mounted in vehicle 10. The first device 100, the second device 200, and the manual terminal 300 may be, for example, devices installed in facilities associated with users.

Other Embodiments

The above-described embodiments are mere examples, and the present disclosure can be implemented with appropriate modifications within a range not departing from the scope thereof. Moreover, the processes and units described in the present disclosure can be freely combined and implemented unless technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Examples of the non-transitory computer-readable storage medium include a random disk (such as a magnetic disk (a floppy (registered trademark) disk an HDD, and the like) or an optical disc (such as a CD-ROM, a DVD disc, and a Blu-ray disc)), a ROM, a RAM, an EPROM, an EEPROM, a magnetic card, a flash memory, an optical card, and a random type of medium suitable for storing electronic instructions.

What is claimed is:

1. An information processing device comprising:
a device information database storing device information;
an input/output unit storing input information specifying a specific function executed by an in-vehicle device; and
a control unit configured to:
acquire the input information and output the electronic manual relating to the specific function;
identify, based on the input information, a first device and a first function executed by the first device;
identify, based on the device information, a second device and a second function executed by the second device;
determine, based on the device information, whether at least one of the first device and the second device is mounted on a vehicle and whether it is able to output the electronic manual for at least one of the first device and the second device;
determine that at least one of the first device and the second device is mounted on the vehicle based on installation information stored in association with the first device and the second device in the device information database;
determine whether to output, with the electronic manual, a first interface for causing the first device to execute the first function and a second interface for causing the second device to execute the second function based on the determination of whether at least one of the first device and the second device is mounted on the vehicle and capable of executing the respective first function and second function;
output, with the electronic manual, the first interface in a case where it is determined that the first device is mounted on the vehicle and capable of executing the first function;
not output the first interface in a case where it is determined that the first device is either not mounted on the vehicle or incapable of executing the first function;

output, with the electronic manual, the second interface in a case where it is determined that the second device is mounted on the vehicle and capable of executing the second function; and
not output the second interface in a case where it is determined that the second device is either not mounted on the vehicle or incapable of executing the second function.

2. The information processing device according to claim 1, wherein the control unit is configured to determine whether at least one of the first device and the second device is capable of executing the respective first function and second function based on execution condition information stored in association with the first device and the second device in the device information database.

3. The information processing device according to claim 1, wherein the control unit is configured to determine whether at least one of the first device and the second device is capable of executing the respective first function and second function based on execution condition information stored in association with the first device and the second device in the device information database.

4. An information processing device comprising:
a device information database storing device information including device identification and function identification;
an input/output unit; and
a control unit configured to:
identify, based on input information from the input/output unit, a first device and a first function executed by the first device;
identify, based on the device information, a second device and a second function executed by the second device associated with the first device and the first function;
acquire driving status of a vehicle, the driving status including running condition of the vehicle and whether a passenger is seated in a rear seat of the vehicle;
determine whether the running condition of the vehicle satisfies at least one of a first condition in which the in-vehicle device corresponding to the device identification is inappropriate to execute a function corresponding to the function identification and a second condition in which the in-vehicle device corresponding to the related device identification is inappropriate to execute the function corresponding to the function identification;
in a case where the running condition satisfies the first condition and the second condition, output a specific information;
in a case where the running condition satisfies only the second condition, output the specific information with only a first interface selectable by the user for causing the first device to execute the first function;
in a case where the running condition satisfies only the first condition, output the specific information with only a second interface selectable by the user for causing the second device to execute the second function; and
in a case where the running condition does not satisfy the first condition and the second condition, output the specific information with the first interface and the second interface selectable by the user.

5. The information processing device according to claim 4, wherein the device information database further includes information regarding device identification,
information regarding function identification, information regarding a manual corresponding to the function identification,
information regarding the first condition,
information regarding associated device identification,
information regarding associated function identification, and
information regarding the second condition function,
the device identification stores an identifier for specifying an in-vehicle device mounted on the vehicle capable of executing function, corresponding to the function identification, executed by the in-vehicle device corresponding to the device identification,
the function identification stores an identifier for specifying a function that can be executed by the in-vehicle device corresponding to the device identification, and
the control unit is configured to output the electronic manual based on the manual information.

6. The information processing device according to claim 5, wherein, based on the device information, the control unit is configured to acquire
the information regarding the manual and the first condition corresponding to specified device identification and function identification; and
the associated device identification, the associated function identification, and the second condition corresponding to specified device identification and function identification.

7. The information processing device according to claim 5, wherein the control unit is further configured to
acquire the driving conditions of the vehicle from a sensor provided in the vehicle,
determine whether the running conditions of the vehicle satisfy the first condition and the second condition, and
determine whether to output the first interface and the second interface for executing the respective first function and second function with the electronic manual, based on whether the running conditions of the vehicle satisfy the first condition and the second condition.

8. The information processing device according to claim 5, wherein the first condition is a state in which the vehicle is running with a remaining amount of fuel or drive battery below a predetermined level, or a state in which the passenger is not seated in a rear seat of the vehicle, and
the second condition is a state in which the remaining amount of the fuel or the drive battery in the vehicle is below the predetermined level, or a state in which the vehicle is not stopped.

9. The information processing device according to claim 5, wherein the first device is provided in the vehicle at a position where information shown on the first device is non-visible from the driver's seat of the vehicle, and
the second device is provided in the vehicle, displaying information to passengers sitting in the driver's seat of the vehicle.

* * * * *